United States Patent [19]

Fleischer et al.

[11] Patent Number: 5,505,162
[45] Date of Patent: Apr. 9, 1996

[54] DOG RESTRAINING DEVICE

[76] Inventors: Frank C. Fleischer; Barbara R. Fleischer, both of 303 55th St. NW., North Canton, Ohio 44720

[21] Appl. No.: 375,581

[22] Filed: Jan. 10, 1995

[51] Int. Cl.$^6$ ................................................ A01K 27/00
[52] U.S. Cl. .......................................................... 119/792
[58] Field of Search .............................. 119/769, 784, 119/788, 791, 792, 793, 795, 797, 798

[56] References Cited

U.S. PATENT DOCUMENTS

| | | | |
|---|---|---|---|
| 3,752,127 | 8/1973 | Baker | 119/797 |
| 4,879,972 | 11/1989 | Crowe et al. | 119/792 |
| 4,947,801 | 8/1990 | Glass | 119/784 X |
| 5,146,876 | 9/1992 | McPhail | 119/798 |

*Primary Examiner*—Thomas Price
*Attorney, Agent, or Firm*—Edward J. Holler

[57] ABSTRACT

An animal restraining device especially useful for valuable and treasured dogs comprising an elongated flexible main cable member with each end having doubled-over portions joined to itself, each doubled-over portion having a sidearm end extension member fixedly joined to the doubled portion to constitute a bifurcated end assembly, and four swivel snap connectors joined to each of the four extremities of the two end assemblies for doubly safe connection to the animal and to an anchoring point. The similar end assemblies permit use of the device reversibly in varied arrangements.

14 Claims, 2 Drawing Sheets

DOG RESTRAINING DEVICE

The present invention relates to a dog or other animal restraining device which includes a flexible elongated main cable member having a pair of bifurcated end assemblies formed from and connected to both ends of the main cable member.

The two end assemblies are preferably similar in design and structure, each being formed from doubled-over end portions of the main cable and a sidearm end extension member permanently connected to each of the doubled-over end portions.

It is a primary object of this invention to provide a unique device to restrain a dog or other animal to ensure its safe and secure retention to a fixed or movable anchoring point. The device may be used to limit or control the movement of the dog, dogs being preferably referenced herein for most common useage of the device, while providing double connection to the dog and to the anchoring point or associated restraint. The device is most useful for restraint of domesticated carnivores, especially large and valuable dogs which range from pets to those having specialized training in a wide variety of breeds and specialization.

The similar end assemblies of the restraining device are relatively simple and inexpensive to manufacture providing strength and durability for long-term use without appreciable wear or breakage and possible loss of the valuable and/or treasured dog. The end assemblies are formed from doubled-over end portions of the main cable and interconnected sidearm end extensions for double connection to the dog and to the anchoring point for secure retention. Each of the extremities of the bifurcated end assemblies has a snap-type connector attached thereto for double joinder to the dog and anchoring point.

Another object of the present invention is to provide a lengthy cable having similar bifurcated ends for interchangeable connection to the dog or anchoring point, and doubly secure attachment to both. The restraining device is readily useable with both large and small dogs and to various types of anchoring points from lengthy elevated-wire dog runs to fixed locations such as trees or posts. The double, yet separate, snap connectors at each end permit their joined at one end to form a leash handle, or to the aforesaid variety of retention arrangements.

In accordance with the foregoing and additional objects which should be apparent to those having ordinary skill in the art, the present invention is hereinafter described with reference to the accompanying drawings which illustrate a preferred embodiment of the invention.

With reference to the drawings, in which the particular numbers designate like or similar parts of the device shown in the different views, it will be apparent that numeral 10 designates an average-size dog which is connected by means of the restraining device 11 in one typical manner of restraint. The device 11 restrains the dog to a limited range of movement along and beneath an elevated wire or line 12 strung between first and second spaced-apart support posts 13 and 14 respectively. The device 11 is connected to the collar 15 of the dog, and more specifically to one or two D-ring members mounted on the collar as described hereinbelow.

Figure 1:
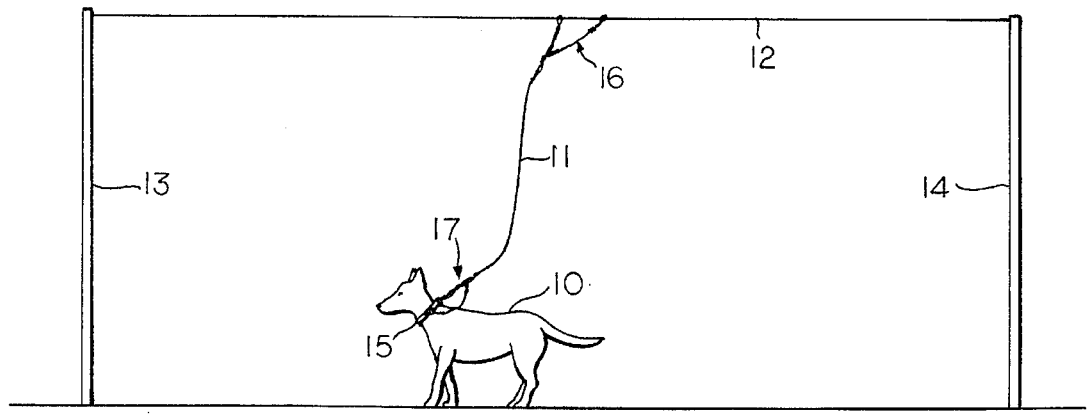
FIG. 1 is an elevational view which shows the present invention in use attached to a dog at its neck, preferably to a dog collar.
Figure 2:
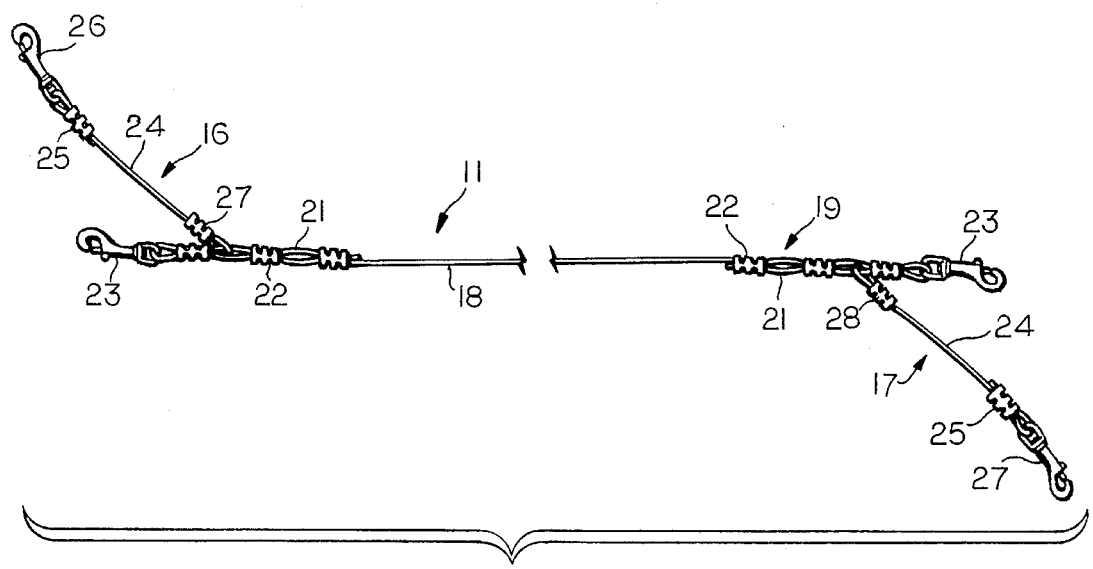
FIG. 2 is an enlarged fragmentary elevational view of the subject dog restraining device showing its similar bifurcated end portions.

The device 11 is constructed having similar bifurcated end assemblies 16 and 17 at both ends, as shown in FIG. 2, the main cable member 18 being very flexible and elongated having a preferred length ranging from about 10 to 30 feet. The main cable 18 is preferably comprised of multistrand steel wire having a plastic coating thereover, such as an imperforate continuous layer (not shown) of polyvinyl chloride for weatherproofing and durability against excessive wear. Main cable 18 has a tensile strengh greater than about 1000 psi.

The end assemblies 16 and 17 are preferably similar in size, shape and construction, and being formed from the same type of material as main cable 18. Only one of the end assemblies, namely 17, is described in detail below. Each of the end assemblies may range in length from about 1 to 2 feet.

As shown in FIG. 2, the end assembly 17 is formed by a looped-over portion of main cable 18, as shown at numeral 19, with the doubled portion 21 joined to itself in close relation by a plurality of rigid spaced-apart clamping members 22, preferably three in number. A swivel-type snap connector 23 is joined to the extremity of the doubled-over portion 21. A sidearm end extension member 24 is joined to the doubled-over portion 21 intermediate two of the plural clamping members 22 and around one length of the doubled portion. The sidearm end extension 24 is clamped to itself by another clamping member 25 near its extremity. The sidearm end extension member 24 has a substantially greater length than the doubled-over portion 21. The free end of sidearm extension member 24 has another swivel-type snap connector 27 joined thereto at a looped end portion by still another clamping member 28. The sidearm member 24 is connected to one length of the doubled portion 21 by a loop and clamping member 28. The two looped and clamped end portions of the device have been designated by numerals 16 and 17 in FIGS. 3 and 4 respectively. Thus, the two interconnected clamped lengths at each end of the device, i.e. the doubled-over main cable portion 21 and the integrally-joined sidearm member 24, comprise a bifurcated strong and durable end assembly having different arm lengths at each end of the main cable.

Figure 3:
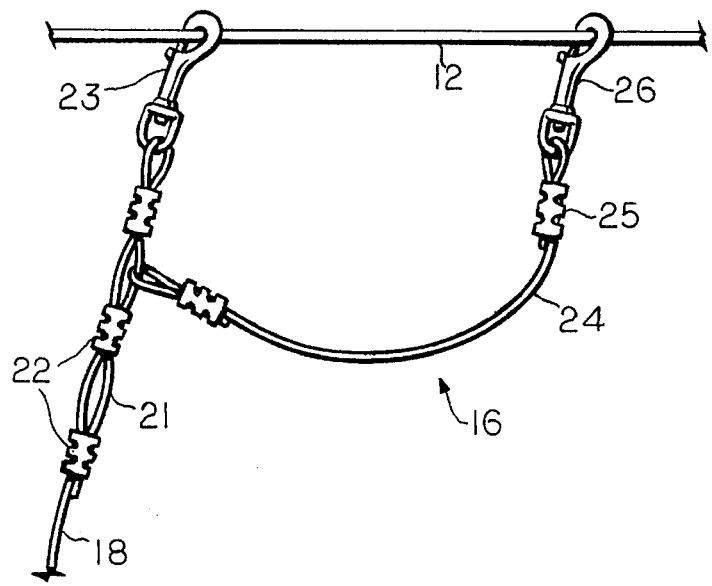
FIG. 3 is a further enlarged elevational view of one end portion of the subject device.
Figure 4:
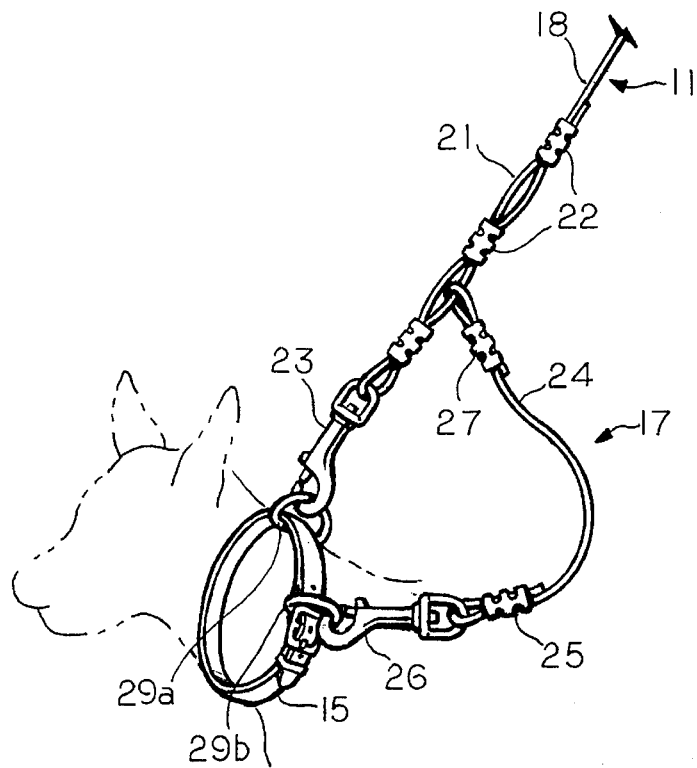
FIG. 4 is an enlarged elevational view of the dog attachment end portion of the device, doubly connected to the dog's collar, the dog being shown in broken outline.

As shown in FIG. 3, the end assembly 16, or alternately end assembly 17, may be connected to the elevated wire or line 12 at two spaced-apart points for doubly safe restraint of the dog, either along a dog run or adjacent a fixed post, tree or building, as desired. FIG. 4 shows how the dog may be doubly restrained by two spaced-apart swivel-type snap connectors 23 and 26 at the other end 17 of the device joined to a pair of D-ring member 29a and 29b as shown in FIG. 4 fastened around two remote localized areas of the dog collar 15. Thus, the dog is doubly secured at both ends of the device to ensure its safety in long-term use of the device.

In addition, the bifurcated end assembly 16 also comprises: a handle when the two snap connectors 23 and 26 adjacent one end assembly 16 are joined together for restraining the dog by end assembly 17, such as when walking the dog by holding end assembly 16. or when changing the location or connection of the end assembly 16.

The similar end asemblies 16 and 17 permit use of the device reversibly in varied arrangements, i.e. either end being capable of connection to the dog or to the fixed or movable remote location. The device may also be used to safely restrain a pair of dogs, one dog being connected to each end of the device by a double connection and physically holding the device at a mid-point of the main cable such as when walking the pair of dogs, Accordingly, the improved dog restraining device is simplified, provides an effective, safe, inexpensive and efficient device which achieves all of the enumerated objectives, provides for eliminating difficulties encountered with prior devices, and solves problems and obtains new and useful results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed. Moreover, the description and illustration of the invention is by way of example, and the scope of the invention is not limited to the exact details shown or described.

Having now described the features, discoveries and principles of the invention, the manner in which the improved restraining device is constructed and used, the characteristics of the construction, and the advantageous, new and useful results obtained; the new and useful devices, parts and combination, are set forth in the appended claims.

We claim:

1. An animal restraining device comprising in combination an elongated flexible main cable member, each end of said main cable member having a doubled-over end portion fixedly joined to itself, a sidearm end extension member fixedly attached to each of said doubled-over end portions of said main cable member to constitute a bifurcated end assembly, and a plurality of four swivel snap connector members, one each attached to the extremities of said doubled-over end portions of said main cable and to the extremities of said sidearm end extension members for double connection to an animal collar and to a restraining anchoring member.

2. The combination in accordance with claim 1, wherein said flexible main cable member is comprised of multistrand steel wires coated with a plastic material.

3. The combination in accordance with claim 1, wherein said doubled-over end portions of said main cable member are each fixedly attached to itself by a plurality of spaced-apart rigid clamping members.

4. The combination in accordance with claim 3, wherein said pair of sidearm end extension members is each fixedly attached to said doubled-over end portions of said main cable member intermediate said plurality of spaced-apart rigid clamping members.

5. The combination in accordance with claim 1, wherein both said main cable member and said sidearm end extension members are comprised of similar multistrand steel wires having an exterior plastic coating thereover and a combined overall diameter of about 3/16 inch.

6. The combination in accordance with claim 1, including an animal collar member having at least one D-type connecting ring mounted thereon, wherein a pair of swivel snap connector members at one bifurcated end assembly of said main cable is detachably connected to said animal collar member at said D-type connecting ring for doubly-safe secure restraint of said animal.

7. The combination in accordance with claim 1, wherein said sidearm end extension members are substantially greater in length than said doubled-over end portions of said main cable member.

8. The combination in accordance with claim 1, wherein said bifurcated end assemblies at each end of said main cable member are substantially similar in shape and dimensions.

9. The combination in accordance with claim 1, wherein said main cable member ranges in length from about 10 to 30 feet and said bifurcated end assemblies each range in length from about 1 to 2 feet.

10. An animal restraining device comprising in combination an elongated flexible main cable member, a bifurcated end assembly member integrally connected to each end of said main cable member, each of said end assembly members comprised of a doubled-over end portion of said main cable member fixedly attached to itself and a sidearm end extension member fixedly joined to the said doubled-over end portion, and a plurality of four swivel snap connector members, one each attached to the extremities of said doubled-over end portions and the sidearm end extension members for double connection to an animal collar and to an anchoring member.

11. The combination in accordance with claim 10, wherein said main cable member and said sidearm end extension members are comprised of similar multistrand steel wire coated with flexible plastic material consisting of polyvinyl chloride.

12. The combination in accordance with claim 10, wherein said bifurcated end assemblies at each end of said main cable member are substantially similar in length and dimensions.

13. The combination in accordance with claim 10, wherein said sidearm end extension members are substantially greater in length than said doubled-over end portions of said main cable and said extension members are durably connected within intermediate areas of said doubled-over end portions by rigid clamping members.

14. The combination in accordance with claim 10, wherein said bifurcated end assemblies at each end of said main cable member are substantially similar in shape, length and dimensions for reversible use in tethering an animal.

* * * * *